United States Patent
Canalini et al.

(10) Patent No.: US 10,919,234 B2
(45) Date of Patent: Feb. 16, 2021

(54) WELDING HEAD

(71) Applicant: Tetra Laval Holdings & Finance S.A., Pully (CH)

(72) Inventors: Pierluigi Canalini, Modena (IT); Alessandro Zuccotti, Modena (IT); Maurizio Montorsi, Modena (IT); Federico Zanichelli, Malmö (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 191 days.

(21) Appl. No.: 15/765,881

(22) PCT Filed: Sep. 19, 2016

(86) PCT No.: PCT/EP2016/072124
§ 371 (c)(1),
(2) Date: Apr. 4, 2018

(87) PCT Pub. No.: WO2017/060061
PCT Pub. Date: Apr. 13, 2017

(65) Prior Publication Data
US 2018/0297294 A1   Oct. 18, 2018

(30) Foreign Application Priority Data
Oct. 5, 2015   (EP) .................................. 15188370

(51) Int. Cl.
*B29C 65/78*   (2006.01)
*B29C 65/00*   (2006.01)
(Continued)

(52) U.S. Cl.
CPC ........ *B29C 65/7814* (2013.01); *B29C 65/368* (2013.01); *B29C 65/3644* (2013.01);
(Continued)

(58) Field of Classification Search
CPC ............ B29C 65/7814; B29C 65/5021; B29C 65/787; B29C 65/3644; B29C 65/561;
(Continued)

(56) References Cited

U.S. PATENT DOCUMENTS

| 2,422,750 A * | 6/1947 | Rue ....................... B29C 65/568 |
| | | 53/304 |
| 3,460,310 A * | 8/1969 | Adcock ............... B29C 65/3656 |
| | | 53/478 |

(Continued)

FOREIGN PATENT DOCUMENTS

| DE | 202007003450 | 5/2007 |
| FR | 2199527 A1 | 4/1974 |

(Continued)

OTHER PUBLICATIONS

International Search Report and Written Opinion from corresponding PCT Application No. PCT/EP2016/072124 dated Nov. 9, 2016 (10 pages).

(Continued)

Primary Examiner — Thomas M Wittenschlaeger
(74) Attorney, Agent, or Firm — Finnegan, Henderson, Farabow, Garrett & Dunner L.L.P.

(57) ABSTRACT

A welding head comprises a welding element (51) for welding a lid (1) to an opening device of a container (10). The welding head (43) further comprises a 5 compensating device (62) operable for compensating a misalignment between the welding element (51) and the lid (1), thereby centering the welding element (51) relative to the lid (1).

15 Claims, 8 Drawing Sheets

(51) Int. Cl.
    *B29C 65/36*     (2006.01)
    *B29C 65/48*     (2006.01)
    *B29C 65/50*     (2006.01)
    *B65B 51/22*     (2006.01)
    *B65B 7/16*     (2006.01)
    *B65B 7/28*     (2006.01)
    *B29C 65/56*     (2006.01)
    *B29K 705/02*     (2006.01)
    *B29L 31/00*     (2006.01)

(52) U.S. Cl.
    CPC ...... *B29C 65/3656* (2013.01); *B29C 65/4815* (2013.01); *B29C 65/5021* (2013.01); *B29C 65/5057* (2013.01); *B29C 65/787* (2013.01); *B29C 66/112* (2013.01); *B29C 66/114* (2013.01); *B29C 66/542* (2013.01); *B29C 66/8169* (2013.01); *B29C 66/81465* (2013.01); *B29C 66/8242* (2013.01); *B29C 66/83541* (2013.01); *B29C 66/849* (2013.01); *B29C 66/8432* (2013.01); *B65B 7/168* (2013.01); *B65B 7/2878* (2013.01); *B65B 51/227* (2013.01); *B29C 65/561* (2013.01); *B29C 66/12441* (2013.01); *B29C 66/12469* (2013.01); *B29C 66/53247* (2013.01); *B29C 66/72321* (2013.01); *B29C 66/8163* (2013.01); *B29K 2705/02* (2013.01); *B29L 2031/7166* (2013.01)

(58) Field of Classification Search
    CPC ............. B29C 65/368; B29C 65/3656; B29C 65/5057; B29C 65/4815; B29C 66/8169; B29C 66/83541; B29C 66/81465; B29C 66/12441; B29C 66/12469; B29C 66/53247; B29C 66/8163; B29C 66/542; B29C 66/112; B29C 66/114; B29C 66/72321; B29C 66/8242; B29C 66/8432; B29C 66/849; B29L 2031/7166; B29K 2705/02; B65B 51/227; B65B 7/168; B65B 7/2878; B65B 7/2835; B23K 2101/125
    USPC ........... 156/69, 308.4, 309.6; 53/478, 329.2; 228/49.6, 184; 219/604, 617
    See application file for complete search history.

(56) References Cited

U.S. PATENT DOCUMENTS

| | | | | |
|---|---|---|---|---|
| 3,783,582 A | * | 1/1974 | Willvonseder | B65B 7/2885 53/67 |
| 3,909,326 A | * | 9/1975 | Renck | B29C 66/542 156/69 |
| 3,928,109 A | * | 12/1975 | Pollock | B29C 43/18 156/69 |
| 3,946,540 A | * | 3/1976 | Solberg | B67B 3/10 53/341 |
| 4,265,696 A | * | 5/1981 | Graves | B29C 65/02 156/443 |
| 4,891,484 A | * | 1/1990 | Waggott | H05B 6/104 219/645 |
| 5,284,001 A | * | 2/1994 | Ochs | B65B 7/2835 53/307 |
| 5,858,141 A | * | 1/1999 | Repp | B29C 65/3644 156/69 |
| 5,946,883 A | * | 9/1999 | Yuyama | B65B 5/103 53/154 |
| 6,079,185 A | * | 6/2000 | Palaniappan | B29C 65/3656 493/212 |
| 6,104,013 A | * | 8/2000 | Miller | B29C 65/3656 156/274.2 |
| 6,362,461 B1 | | 3/2002 | Wiening et al. | |
| 6,412,252 B1 | * | 7/2002 | Sarles | B29C 65/3668 53/329.2 |
| 7,322,160 B2 | * | 1/2008 | Herzog | B29C 65/3656 53/329.2 |
| 7,834,298 B2 | * | 11/2010 | Metodiev | H05B 6/103 219/633 |
| 8,360,125 B2 | * | 1/2013 | Schwiese | B29C 65/3656 156/380.2 |
| 9,808,883 B2 | * | 11/2017 | Ballough | B23K 20/10 |
| 10,131,455 B2 | * | 11/2018 | Morin | B65B 51/227 |
| 2001/0032839 A1 | * | 10/2001 | Herzog | B65B 7/2878 219/633 |
| 2003/0101689 A1 | * | 6/2003 | Guillou | B65B 31/025 53/432 |
| 2004/0035088 A1 | * | 2/2004 | Loeffler | B26D 1/045 53/329.2 |
| 2010/0186349 A1 | * | 7/2010 | Zanini | B65B 7/2835 53/317 |
| 2012/0222388 A1 | * | 9/2012 | Kronawitter | B65B 7/2835 53/317 |
| 2014/0215973 A1 | * | 8/2014 | Hagelqvist | B65B 31/02 53/478 |
| 2016/0355286 A1 | * | 12/2016 | Cavazza | B65B 29/022 |
| 2017/0197741 A1 | * | 7/2017 | Carvin | B65B 3/04 |
| 2018/0068515 A1 | * | 3/2018 | Edwards | B65B 3/00 |

FOREIGN PATENT DOCUMENTS

| | | |
|---|---|---|
| JP | 2000-516563 | 12/2000 |
| WO | WO 9814373 A1 | 4/1998 |

OTHER PUBLICATIONS

Office Action in Japanese Application No. 2018-517630 dated Sep. 29, 2020 (2 pgs.).

* cited by examiner

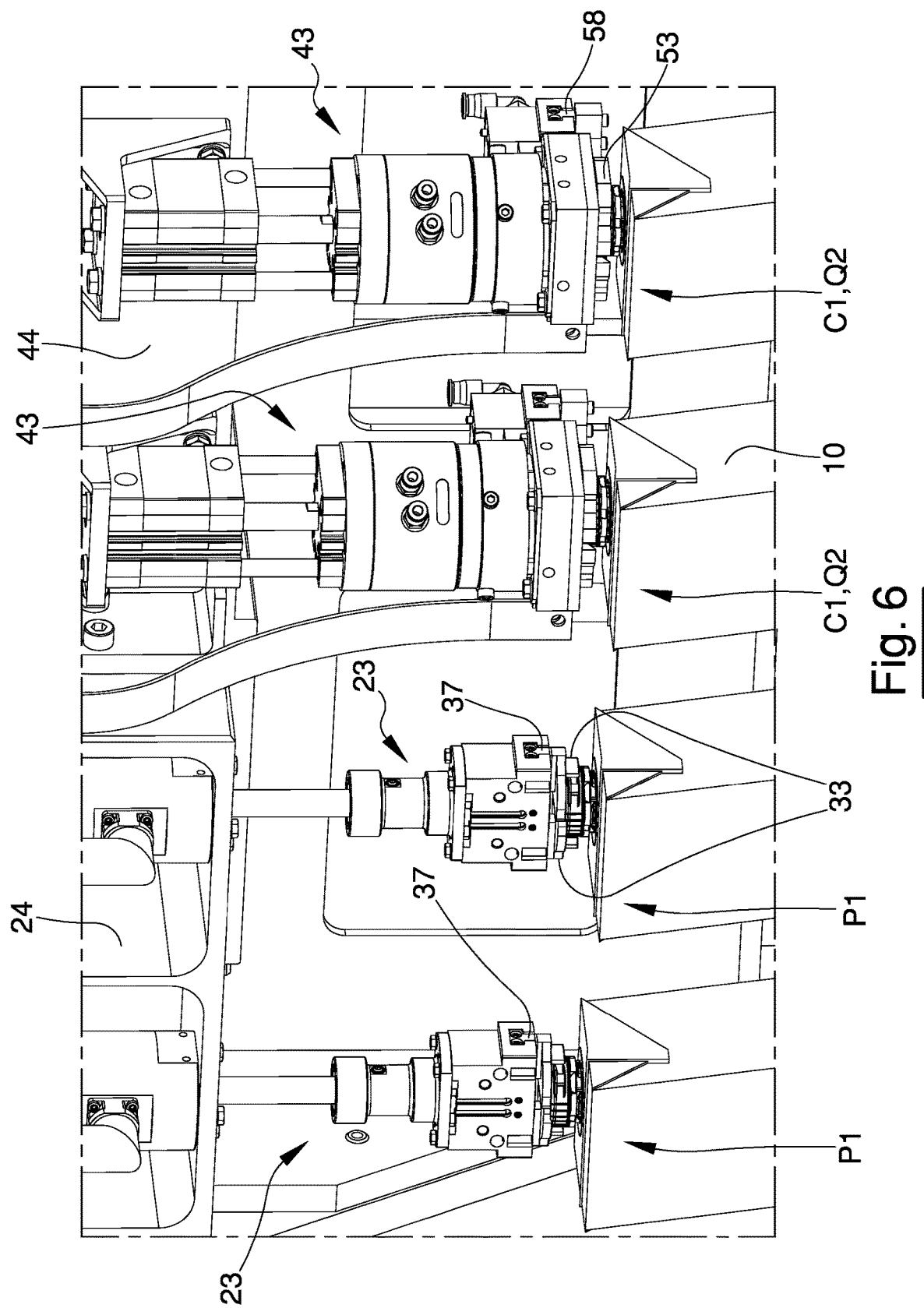

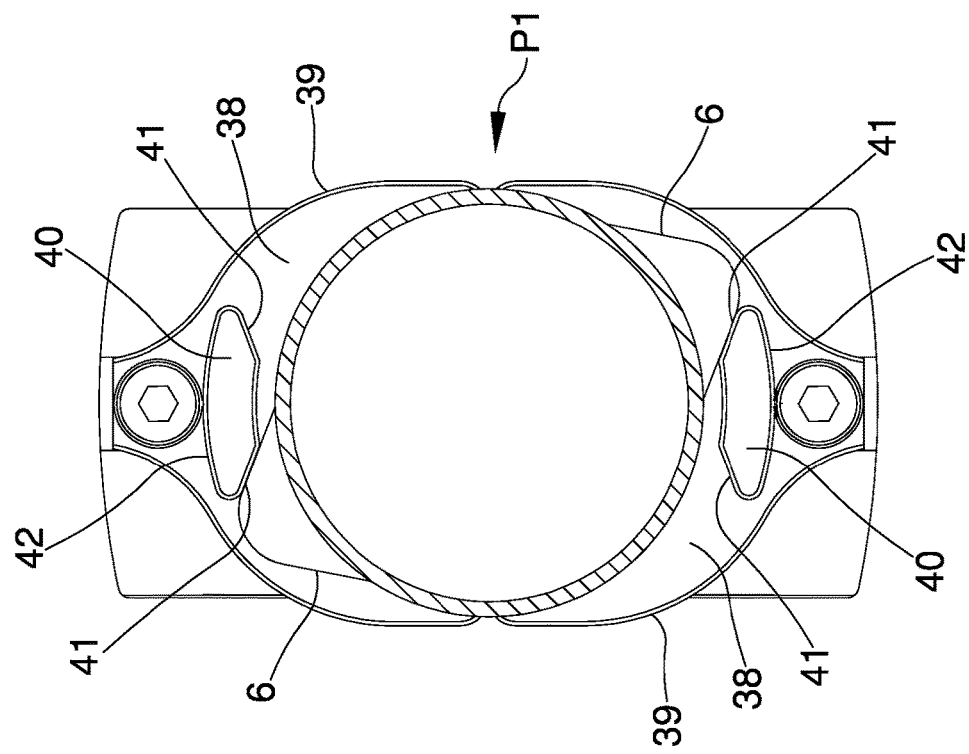
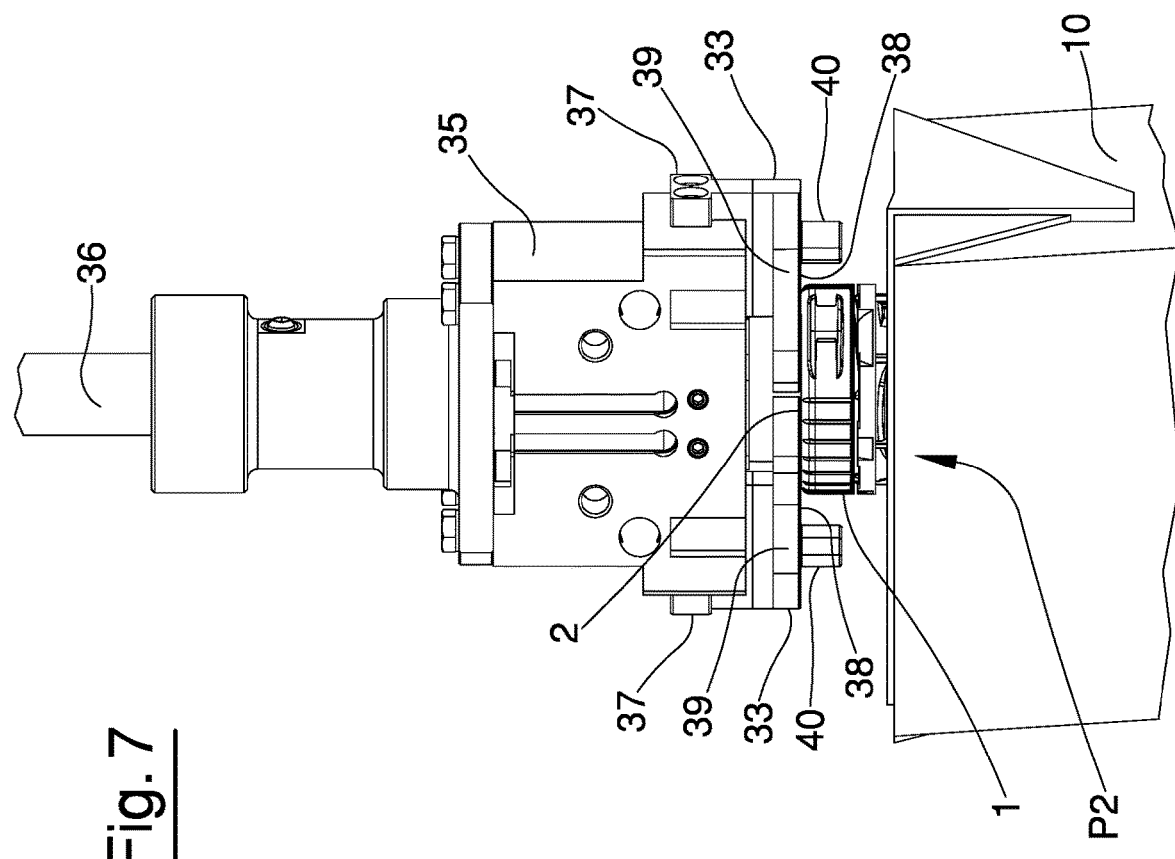

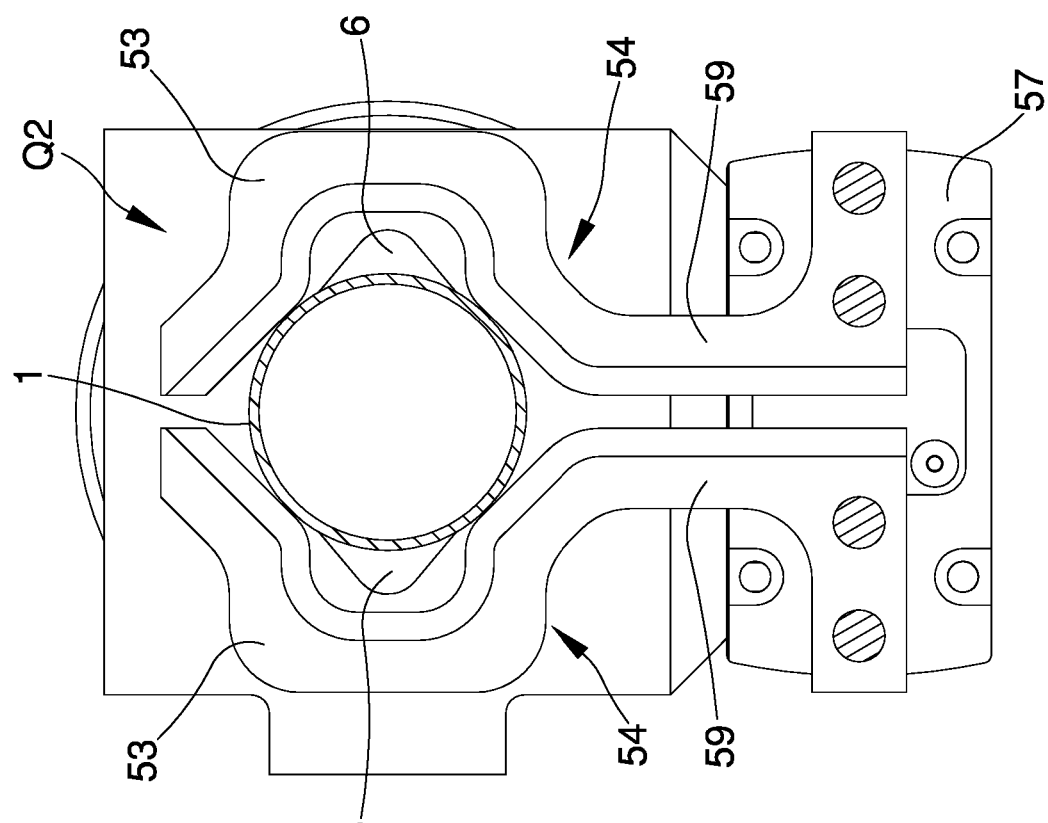
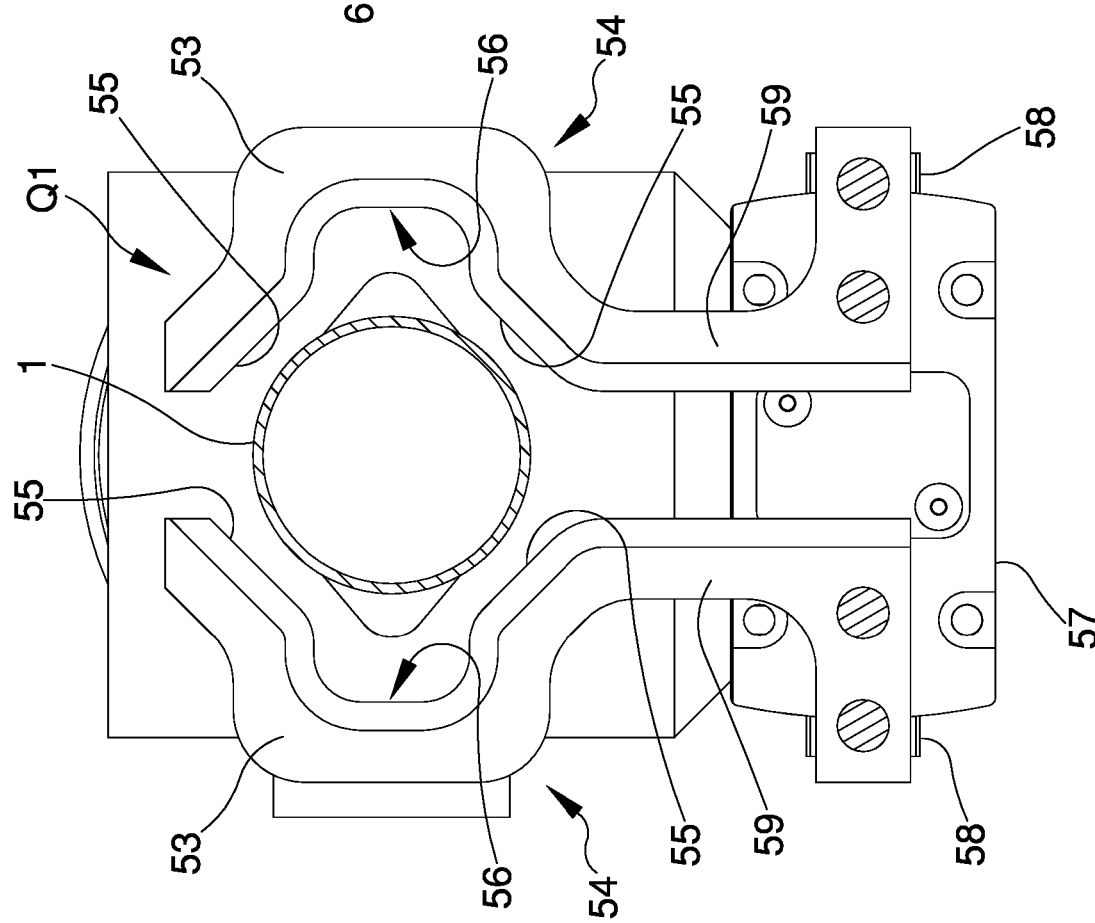

WELDING HEAD

CROSS-REFERENCE TO RELATED PATENT APPLICATIONS

This is a National Phase of International Application No. PCT/EP2016/072124, filed Sep. 19, 2016, which claims the benefit of European Application No. 15188370.9, filed Oct. 5, 2015. The entire contents of the above-referenced applications are expressly incorporated herein by reference.

TECHNICAL FIELD

The invention relates to a welding head for welding a lid onto a container, particularly a sealed container for packaging pourable food products. The welding head according to the invention is especially suitable for welding a lid onto a neck that has been moulded on a sheet packaging material, the latter being in turn adapted to be folded, filled with a pourable food product and sealed to form a container.

BACKGROUND OF INVENTION

As known, many pourable food products, such as fruit juice, UHT (ultra-high-temperature treated) milk, wine, tomato sauce, etc., are sold in containers made of sterilized sheet packaging material.

A typical example of this type of containers is the parallelepiped-shaped container for liquid or pourable food products known as Tetra Brik Aseptic (registered trademark), which is made by folding and sealing laminated strip packaging material.

The packaging material has a multilayer structure substantially comprising a base layer for stiffness and strength, which may include a layer of fibrous material, e.g. paper, or mineral-filled polypropylene material, and a number of lamination layers of heat-sealable plastic material, e.g. polyethylene films, covering both sides of the base layer.

In the case of aseptic containers for long-storage products, such as UHT milk, the packaging material also comprises a layer of gas-barrier material, e.g. aluminium foil or ethyl vinyl alcohol (EVOH) film, which is superimposed on a layer of heat-sealable plastic material, and is in turn covered with another layer of heat-sealable plastic material forming the inner face of the container eventually contacting the food product.

Containers of this sort are normally produced on fully automatic packaging machines, which are fed with a web of packaging material that is sterilized on the packaging machine, e.g. by applying a chemical sterilizing agent, such as a hydrogen peroxide solution, which, once sterilization is completed, is removed from the surfaces of the packaging material, e.g. evaporated by heating. The web of packaging material so sterilized is then maintained in a closed, sterile environment, and is folded and sealed longitudinally to form a vertical tube.

The tube is filled with a sterilized or sterile-processed food product, and is sealed and subsequently cut along equally spaced cross sections to form pillow packs, which are then folded mechanically to form respective finished, e.g. substantially parallelepiped-shaped, containers.

Alternatively, the packaging material may be cut into blanks, which are formed into containers on forming spindles, and the containers are filled with the food product and sealed. One example of this type of container is the so-called "gable-top" container known by the trade name Tetra Rex™.

To open the containers described above, various solutions have been proposed, including reclosable opening devices made of plastic material and substantially comprising a pouring spout, defining a through pouring opening and fitted to a hole in a wall of the container.

When producing the opening device, the opening of the pouring spout is sealed by a closing element connected integrally to the pouring spout and detachable from it along a normally circular tear line. The closing element extends at the same level as the packaging material, so as to seal the hole in the wall of the container. On the side facing the lid, the closing element has an integral projecting pull ring, the free end of which is pulled by the user to detach the closing element from the pouring spout along the tear line and so open the pouring opening. More specifically, the pull ring extends inside, and at a predetermined distance from, the pouring spout.

It is also possible to fix the closing element of the opening device directly over a prelaminated hole in the packaging material, i.e. a hole formed in the base layer only and covered by the other lamination layers, including the layer of gas-barrier material.

In both cases, a removable, e.g. screw or hinged, lid, is subsequently fitted to the pouring spout in order to outwardly close the latter.

The opening devices disclosed above have excellent sealing properties. However, they have the drawback that, the first time a user opens a container closed by an opening device of the kind disclosed above, two steps must be performed before being capable of pouring the content of the container. In a first step, the user removes the lid removably fitted to the pouring spout.

In a second step, the user detaches the closing element from the pouring spout along the tear line, by acting on the pull ring.

In order to provide a container that can be opened in one step only, a solution has been proposed, in which the closing element of the opening device is formed in one piece with a protruding portion extending inside the pouring spout and welded to the lid. An end wall of the lid is provided with a disk-shaped welding promoting element that is welded to the protruding portion so that, when removing the lid from the pouring spout, the protruding portion and the closing element remain attached to the lid. Thus, the first time a user opens the container, the lid and the closing element can be removed from the pouring spout in a single operation. A container provided with a lid of the kind disclosed above can be called a "one-step-opening container". In order to weld the lid to the protruding portion integral with the closing element, it is possible to use an electric induction generating element comprising a coil that, when activated, induces an electric current in a conductive layer of the welding promoting element. Localized heat is consequently generated in a heat-sealable layer of the welding promoting element, which causes the end wall of the lid—including the welding promoting element—to become attached to the protruding portion.

To ensure that the end wall of the lid is correctly welded to the protruding portion, the coil of the electric induction generating element needs to be centered relative to the end wall of the lid.

This issue is particularly critical, also in view of the dimensions, shape and position of the neck and the lid, which may vary within relatively large tolerances. In particular, the dimensions and shape of the container may vary to a certain extent due to the flexible nature of the material forming the container, namely a sheet packaging material.

The dimensions and shape of the neck may also vary within a relatively large range, because the neck is moulded directly on the sheet packaging material forming the container, by using a polymeric material having a limited stiffness. For these reasons, the position of the neck relative to the corresponding container may vary from a container to another.

Also the lid, which is made of a relatively flexible material such as plastics, may have a shape and dimensions that are not exactly repeatable between different lids.

It may therefore happen that an electric induction generating element, which is perfectly centered relative to a lid applied onto a container neck, is in a non-centered position relative to a subsequent lid applied onto another container neck.

This situation is worsened because the containers at issue, which are normally sealed containers for packaging pourable food products, are produced by machines that operate at significantly high output rates. Hence, the available time for welding a lid to a protruding portion of a neck is limited.

Consequently, it may happen that some lids are not perfectly welded to the corresponding containers.

DISCLOSURE OF INVENTION

An object of the invention is to provide a welding head that is capable of effectively and reliably welding a lid to an opening device of a container.

Another object is to provide a welding head for welding lids onto opening devices of respective containers, which ensures a good welding quality even if the containers interact with the welding head at a position that may vary between different containers.

A further object is to provide a welding head that can be used to weld lids onto respective opening devices of container, which guarantees good performances in spite of the containers, and/or the opening devices, and/or the lids, having shapes and/or dimensions that differ from one another.

Another object is to provide a welding head that can be used to weld a lid to an opening device of a container, which ensures a good welding quality even at high production rates.

According to the invention, there is provided a welding head comprising a welding element for welding a lid to an opening device of a container, characterized in that the welding head further comprises a compensating device operable for compensating a misalignment between the welding element and the lid, thereby centering the welding element relative to the lid.

The compensating device allows the welding element to be centered relative to subsequently processed lids, even if the lids are in positions that differ from the respective theoretical positions. A good welding quality is thus ensured.

The misalignments between the lid and the welding element, which can be compensated by the compensating device, may in particular be due to a variability in dimensions and/or shape of the neck and/or of the lid. Owing to the compensating device, the lid may be successfully welded to the opening device, irrespective of the relatively large tolerances within which the dimensions or shape of the container, neck or lid are variable.

Furthermore, by centering the welding element relative to the lid, the welding time necessary for welding the lid to the opening device may be minimized, which makes the welding head according to the invention capable of operating even at high production rates.

In an embodiment, the welding element comprises an electric induction generating element for generating an electric current capable of heat-sealing the lid to the opening device.

The compensating device allows a coil included in the electric induction generating element to be centered relative to subsequently processed lids. The electric induction field generated by the coil, which is localized in a relatively narrow zone, may thus be centered relative to the lid, thereby ensuring a good welding quality.

BRIEF DESCRIPTION OF THE DRAWINGS

The invention will be better understood and carried out with reference to the enclosed drawings, which show an exemplifying and non-limiting embodiment thereof, in which:

FIG. 6 is a view like FIG. 5, showing the applying heads and the welding heads in a different working configuration;

FIG. 7 is an enlarged front view, showing a detail of an applying head in the working configuration of FIG. 5;

FIG. 8 is an enlarged plan bottom view, showing two gripping elements of the applying head of FIG. 7 coupled to a lid;

FIG. 11 is an enlarged plan bottom view, showing two gripping members of a welding head in the working configuration of FIG. 9;

FIG. 12 is an enlarged plan bottom view, showing the gripping members of FIG. 11 in the working configuration of FIG. 6.

DETAILED DESCRIPTION OF PREFERRED EMBODIMENTS

Figure 1:
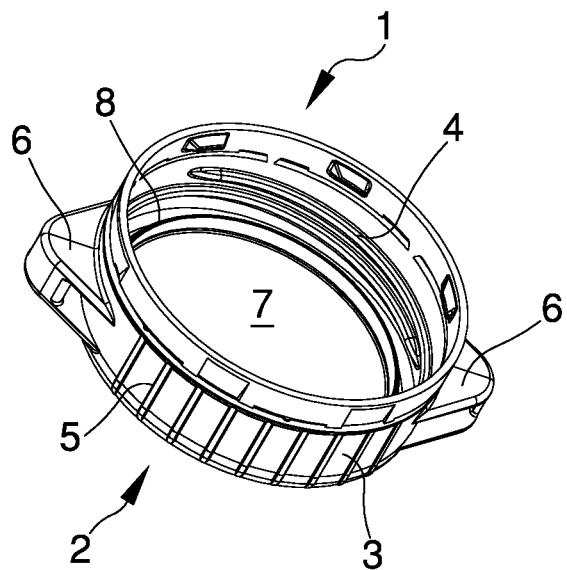
FIG. 1 is a perspective view of a lid intended to be applied onto a neck of a container.

FIG. 1 shows a lid 1 intended to be applied onto a container neck. The lid 1 comprises an end wall 2, which may be shaped as a disk, particularly a circular disk. The lid 1 further comprises a side wall 3, which may be substantially cylindrical, appended to the end wall 2.

The side wall 3 extends around an axis of the lid 1, whereas the end wall 2 extends transversely, in particular perpendicularly, to the axis of the lid 1.

The side wall 3 is provided with one or more internal threads 4 capable of engaging with corresponding threads obtained on the container neck. The side wall 3 may be externally provided with a plurality of knurls 5, which allow a user to more easily grip the lid 1.

Two appendages 6 project from an outer surface of the side wall 3, at diametrically opposite positions.

A welding promoting element 7, which may be for example disk-shaped, is anchored to an inner surface of the end wall 2, i.e. to a surface that, in use, faces the container neck.

The lid 1 may comprise an annular rib 8, obtained integrally with the end wall 2, which axially protrudes from the end wall 2 towards the inside of the lid 1. The annular rib 8 defines a seat for receiving the welding promoting element 7.

The welding promoting element 7 is defined by a multi-layer sheet element distinct from the end wall 2 and permanently connected to the latter. In particular, the welding promoting element 7 comprises a layer of conductive material, e.g. an aluminium foil, and at least two layers of heat-sealable plastic material, e.g. polyethylene films, covering both sides of the layer of conductive material and defining respective opposite faces of the welding promoting element 7. A face of the welding promoting element 7 is welded to the end wall 2 by the heat generated when inducing a current in the layer made of conductive material.

Figure 2:
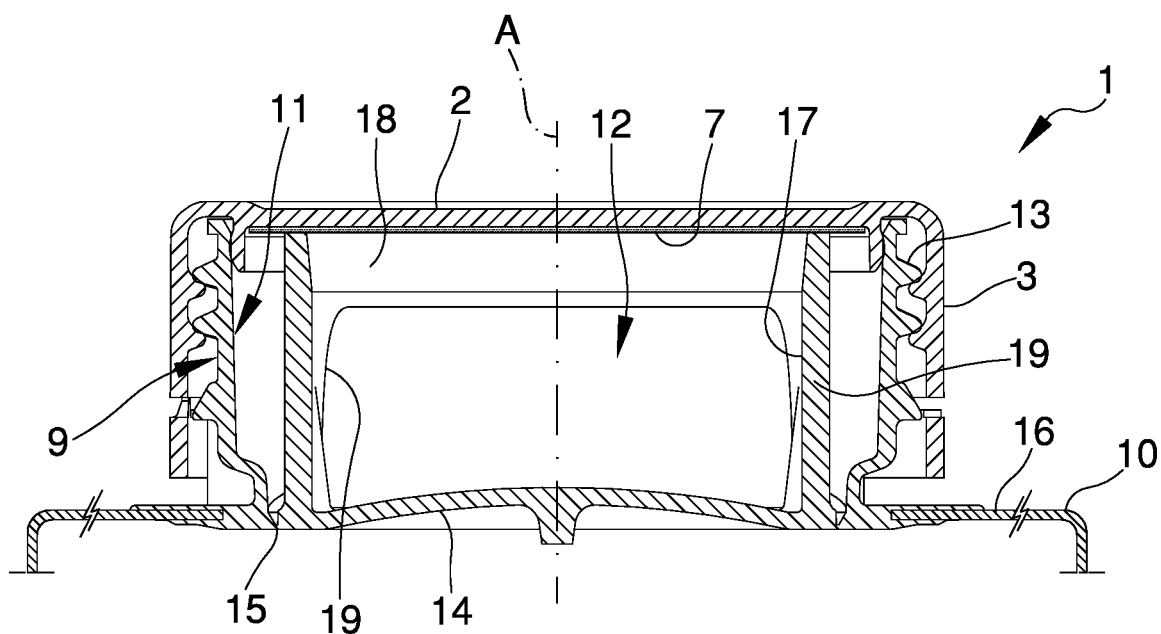
FIG. 2 is an enlarged cross-section showing the lid of FIG. 1, screwed onto a corresponding neck.

As shown in FIG. 2, the lid 1 is intended to be applied onto a neck 9 of a container 10, particularly a sealed container for packaging pourable food products.

The neck 9 is included in an opening device comprising a pouring spout 11 fixed to the packaging material forming the container 10. The neck 9 has a substantially cylindrical tubular shape and extends around an axis A. The neck 9 defines a pouring opening 12, through which the content of the container 10 can be poured by a user. On an outer surface of the neck 9, extending around the axis A, one or more outer threads 13 are provided, which are capable of engaging with the inner threads 4 of the lid 1. Thus, the lid 1 can be removably coupled to the neck 9. When the lid 1 is screwed onto the neck 9, the axis of the lid 1 is coincident with the axis A of the neck 9.

The pouring opening 12 is initially closed by a closing element 14 that is integrally connected to the pouring spout 11 at a tear line 15, along which the closing element 14 can be detached from the pouring spout 11.

The pouring spout 11 and the closing element 14 are formed in one piece on a receiving portion 16 of the packaging material forming the container 10, whilst the lid 1 is formed separately from the pouring spout 11 and the closing element 14, and then fitted thereto. The pouring spout 11 and the closing element 14 may be obtained by moulding molten plastic material—in particular by an injection moulding operation—on the packaging material before it is transformed into a container 10.

The receiving portion 16 may be defined by a so called pre-laminated hole made in the packaging material forming the container 10, i.e. a hole made through a base layer of the packaging material and covered by one, two, or more lamination layers of the packaging material, which seal the hole. In an alternative embodiment, the receiving portion 16 may be simply defined by a hole made through the whole thickness of the packaging material forming the container 1, which is intended to be sealed by the pouring spout 11 and the closing element 14. In another embodiment, the receiving portion 16 may be defined by a patch fixed to the rest of packaging material to seal a hole formed, in this case, through the whole thickness of the packaging material.

The closing element 14 is formed in one piece with a protruding portion 17 extending through the pouring opening 12. The protruding portion 17 is intended to be welded to the welding promoting element 7, after the lid 1 has been screwed onto the neck 9.

The protruding portion 17 may comprise an annular body for contacting the welding promoting element 7, and two or more legs 19 for connecting the annular body 18 to the closing element 14. In the example shown, the legs 19 are diametrically opposite one another.

The container 10 is formed, filled and sealed in a filling machine and is already provided with the pouring spout 11, the closing element 14 and the protruding portion 17 when leaving the filling machine. Thereafter, as will be described in greater detail hereinbelow, an applying head screws a lid 1 onto the neck 9. The welding promoting element 7 of the lid 1 is then welded to the protruding portion 17, by inducing an electric current in the conductive layer of the welding promoting element 7. This current melts the heat-sealable layer of the welding promoting element 7 that faces the neck 9, thereby permanently joining the welding promoting element 7 to the protruding portion 17.

In use, the first opening of the container 10 is obtained by rotating the lid 1 relative to the pouring spout 11 around the axis A. At the beginning of the rotation impressed by the user on the lid 1, the legs 19 bend in the direction of rotation, thereby exerting a pulling action on the closing element 14 at a given point of the tear line 15. In other words, due to the legs 19, the torque exerted on the lid 1 is transformed in a pulling action on the closing element 14, which starts to detach from the pouring spout 11 at two given points along the tear line 15.

Figure 3:
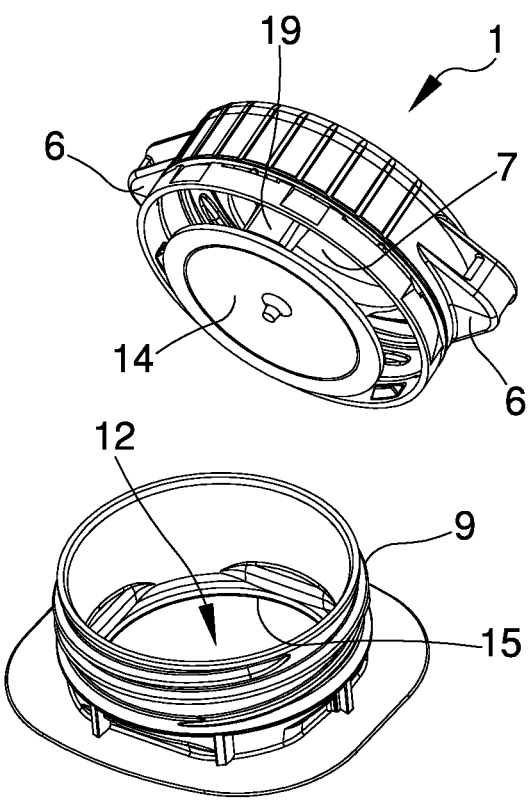
FIG. 3 is a perspective view showing the lid and neck of FIG. 2, when the lid has been removed from the respective container by a user.

By continuing to rotate the lid 1, the latter unscrews completely from the pouring spout 11. As shown in FIG. 3, the closing element 14 is fully detached from the pouring spout 11 along the tear line 15, and remains attached to the lid 1. At this point, the user can pour the content of the container 10 through the pouring opening 12.

The user can then use the lid 1 to again close or open the container 10, by screwing the lid 1 onto the neck 9 or respectively unscrewing the lid 1 from the neck 9, as often as desired.

Figure 4:
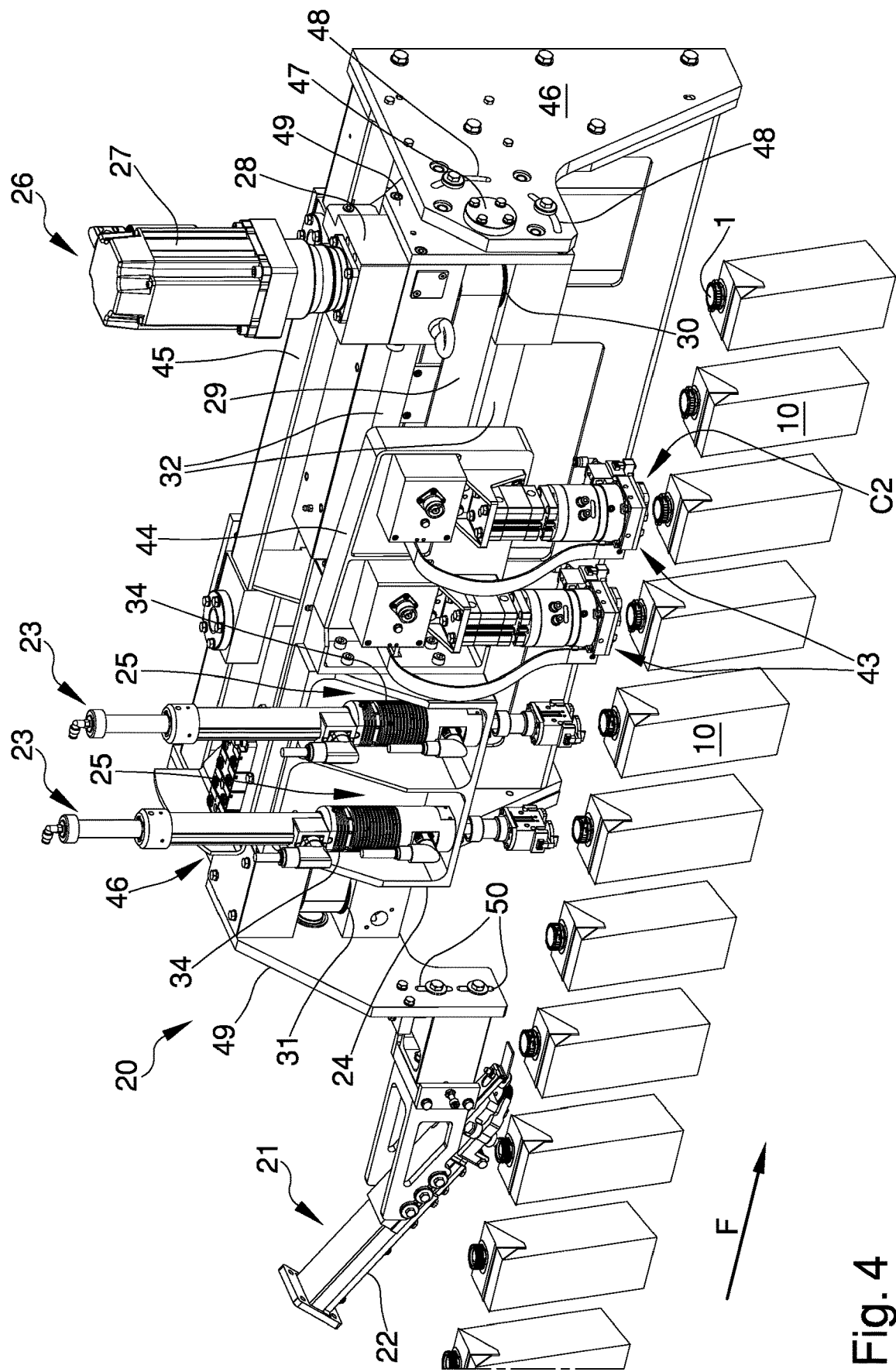
FIG. 4 is a perspective view showing an apparatus for applying lids onto corresponding necks of containers.

FIG. 4 shows an applying unit or apparatus 20 for applying lids 1 onto respective containers 10, which have already been formed, filled and sealed in a filling machine provided upstream of the apparatus 20.

Each container 10 has, in the embodiment shown, a substantially parallelepiped body and a slanted top wall, i.e. a top wall that is inclined with respect to a base wall of the container 10. In other words, when the base wall of the container 10 rests on a horizontal surface, the top wall is inclined with respect to a horizontal plane parallel to the base wall.

In another embodiment, not shown, each container 10 has a substantially parallelepiped body and a top wall substantially parallel to the base wall.

In general, the apparatus 20 may work with containers 10 having different shapes and/or dimensions.

The apparatus 20 comprises a conveying device, which is not shown, for advancing the containers 10 in an advancement direction F, particularly along a rectilinear path. The conveying device may comprise a linear conveyor, for example a belt conveyor or a roller conveyor. The conveying device may be configured to advance the containers 10 continuously along the advancement direction F.

Upstream of the conveying device, a sequencing device may be provided, in order to arrange the containers 10 at a preset distance one from another, i.e. in a sequence having a preset pitch. It is thus ensured that the containers 10 are regularly spaced when entering the apparatus 20.

The apparatus 20 further comprises a distribution unit for feeding the lids 1 to the necks 9 of the containers 10 advancing along the advancement direction F. The distribution unit 21 may comprise a slide 22 and a feeding unit, which is not shown, for supplying the lids 1 to the slide 22. The slide 22 is inclined with respect to the conveying device that conveys the containers 10 along the advancement direction F, so that the distance between the slide 22 and the conveying device decreases when moving along the advancement direction F.

At a lower end of the slide 22, a dispensing opening is provided, which is so configured as to loosely retain one lid 1.

When a container 10, advanced along the advancement direction F, reaches the slide 22, the neck 9 of the container 10 interacts with the lid 1 retained by the dispensing opening of the distribution unit 20 and removes the lid 1 from such dispensing unit. In other words, the lid 1 is stripped from the dispensing opening located downstream of the slide 22 by the neck 9 of an underlying container 10. Therefore, downstream of the slide 22, the lid 1 is positioned on the neck 9, although not being fully screwed onto the neck 9. The apparatus 20 further comprises a group of applying heads 23 for applying the lids 1 to the respective containers 10, particularly by screwing each lid 1 onto a corresponding neck 9 of a container 10.

In the embodiment shown, the group of applying heads comprises two applying heads 23, arranged in sequence along the advancement direction F. However, the group of applying heads may comprise also a number of applying heads 23 different from two, for example three, four or more applying heads 23. Each applying head 23 is arranged to screw a lid 1 onto a corresponding neck 9.

The applying heads 23 are supported by a common support element 24. The support element 24 may be formed in one piece, or may be assembled from a plurality of components that are connected one to another so as to behave, in use, like a single piece.

In the example shown, the support element 24 is shaped as a back plate from which a plurality of projecting walls extend, so as to define a plurality of recesses 25, in each of which an applying head 23 is partially housed. The support element 24 may nevertheless have shapes different from that shown in the drawings.

The applying heads 23 are fitted to the support element 24 so that the distance between two consecutive applying heads 23 is equal to the distance between two consecutive containers 10 advanced along the advancement direction F, i.e. to the pitch of the containers 10. A movement device 26 is provided for moving the group of applying heads 23 along the advancement direction F, so that each applying head 23 is coupled to an underlying container 10 for a portion of the path thereof along the advancement direction F. In other words, the movement device 26 allows the applying heads 23 to follow the containers 10 with which they interact along a portion of the path of the containers 10. The applying heads 23 are hence movable synchronously with the conveying device that advances the containers 10 in the advancement direction F, along the above mentioned portion of the path of the conveying device.

The movement device 26 may comprise a motor 27, possibly connected to a gear box 28, arranged for driving a pulley 30 around which a belt 29 is wound. The belt 29 is further wound around a driven pulley 31. The belt 29 has an active branch that is intended to drive the support element 24 and runs parallelly to the advancement direction F.

A pair of guiding bars 32, each of which extends parallelly to the advancement direction F, is provided for guiding the support element 24 as the latter moves along the advancement direction F. In particular, a sliding element that is not shown is slidable along the guiding bars 32. The support element 24 is fixed relative to the sliding element.

One or more connecting plates, which are not shown, are fastened to the belt 29. The connecting plates are fixed relative to the sliding element mentioned above.

The motor 27 is configured for rotating the pulley 30 in two opposite rotation directions, so that the belt 29 may be driven forwards or backwards parallelly to the advancement direction F.

When the active branch of the belt 29 moves parallelly to the advancement direction F, the support element 24—which, as explained above, is fixed relative to the belt 29—moves together with the belt 29. The applying heads 23, which are supported by the support element 24, are therefore moved forwards or backwards along the advancement direction F. In particular, when the applying heads 23 are moved forwards along the advancement direction F, the applying heads 23 can follow respective containers 10 so that each applying head 23 applies a lid 1 on the corresponding neck 9. After disengaging from respective containers 10, the applying heads 23 can be moved backwards along the advancement direction F so as to be brought back to a starting point at which the applying heads 23 can start to interact with new containers 10.

The movement device 26 thus moves synchronously the applying heads 23, which means that the applying heads 23 are moved together along the advancement direction F by the movement device 26. In other words, the applying heads 23 are moved by the movement device 26 simultaneously and by the same extent, along the advancement direction F.

In an embodiment that is not shown, the movement device may comprise a toothed rack fixed relative to the support element 24. The motor 27 has a shaft coupled to a toothed wheel or pinion that engages with the toothed rack, so as to move the latter forwards or backwards parallelly to the advancement direction F.

More in general, the movement device 26 may comprise any transmission device that is capable of transforming rotation of a shaft of the motor 27 into a linear motion of a linearly movable element fixed relative to the support element 24.

As shown in FIGS. 5 to 8, each applying head 23 comprises a pair of gripping elements 33 intended to interact with the lid 1 for screwing it onto the neck 9. The gripping elements 33 of an applying head 23 are supported by a supporting component 35 connected to a stem 36. Each applying head 23 further comprises a driving device 34 for driving the gripping elements 33. The driving device is fastened to the support element 24. The driving device 34 is directly connected to the stem 36, so as to move the supporting component 35 and hence drive simultaneously both the gripping elements 33.

In particular, the driving device 34 is capable of causing the stem 36 to slide parallelly to the longitudinal axis thereof, thereby displacing the supporting component 35 and hence the gripping elements 33 in a direction parallel to the axis A of a neck 9. The gripping elements 33 can thus be moved towards a lid 1 to be screwed, or alternatively be moved away from a lid 1 that has already been screwed onto the corresponding neck 9. To this end, the driving device 34 may comprise a linear motor.

The driving device 34 is furthermore configured to rotate the stem 36, and hence the supporting component 35 and the gripping elements 33, around a longitudinal axis of the stem 36 that, in use, coincides with the axis A of a neck 9.

By rotating the supporting component 35 around the longitudinal axis of the stem 36, while the latter is moved towards the container 1, the gripping elements 33 move along a helix, thereby screwing the lid 1 onto the neck 9, as will be described in greater detail hereinbelow.

As shown in FIGS. 7 and 8, each gripping element 33 comprises an abutment plane 38 for contacting the end wall 2 of the lid 1. The abutment plane 38 is, for example, obtained on a main portion 39 of the gripping element 33, which may be approximately semicircular in plan view.

Each gripping element 33 further comprises a screwing portion 40, which projects from the abutment plane 38 towards the container 10, i.e. away from the supporting component 35. The screwing portion 40 is delimited by two active surfaces 41, each of which is capable of interacting with an appendage 6 of a lid 1. In the example shown, the active surfaces 41 are substantially flat and each active surface 41 lies in a plane that is parallel to the axis A of the neck 9.

The screwing portion 40 is further delimited by two joining surfaces 42, each of which is interposed between the active surfaces 41. The joining surfaces 42 may be shaped as portions of cylindrical surfaces, particularly coaxial one to another.

Each gripping element 33 comprises a guiding portion 37, for example T-shaped, which is slidable inside a correspondingly shaped seat obtained in the supporting component 35. The guiding portion 37 projects from a face of the main portion 39 opposite a further face of the main portion 39 from which the screwing portion 40 projects.

Figure 5:
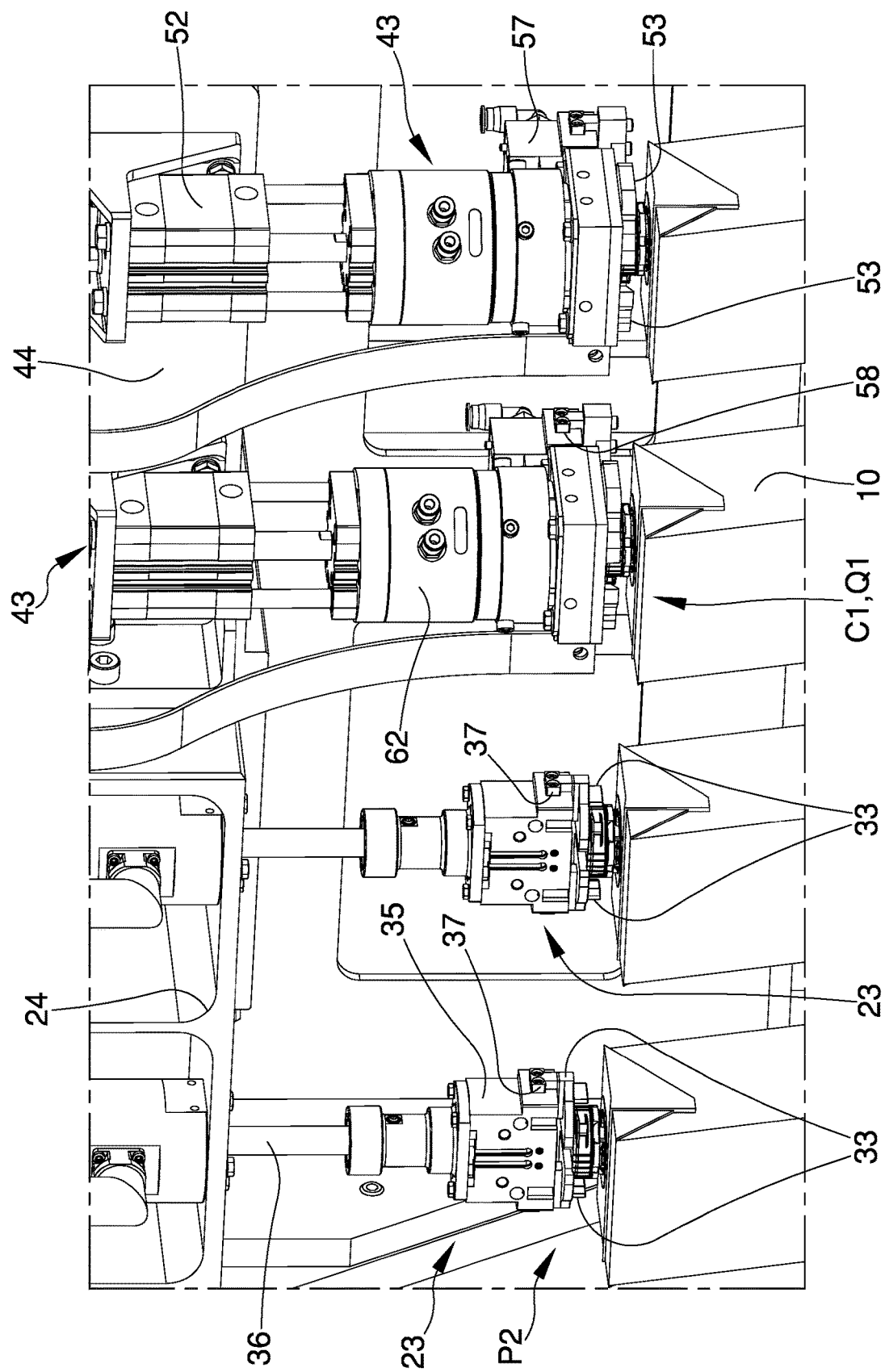
FIG. 5 is an enlarged perspective view, showing two applying heads and two welding heads of the apparatus of FIG. 1, in a working configuration.

The gripping elements 33 of an applying head 23 are movable between an engagement position P1, shown in FIGS. 6 and 8, and a disengagement position P2, shown in FIGS. 5 and 7. In the engagement position P1, the gripping elements 33 are close to one another, so that the active surfaces 41 of the screwing portions 40 may interact with the appendages 6 of a lid 1 in order to rotate the lid 1 around the axis A of the neck 9. In the disengagement position P2, the gripping elements 33 are far from one another, so that the screwing portions 40 are arranged externally of the appendages 6 and cannot interact with the appendages 6.

When moving from the disengagement position P2 to the engagement position P1 or vice versa, the gripping elements 33 move towards one another or away from one another along a direction that is perpendicular to the axis A of the neck 9. The guiding portions 37 slide in the seats of the supporting component 35, which keep the gripping elements 33 guided along their stroke from the engagement position P1 to the disengagement position P2 or vice versa.

A pneumatic arrangement is provided for displacing the gripping elements 33 from the engagement position P1 to the disengagement position P2 or vice versa. The pneumatic arrangement comprises a pneumatic circuit inside which a pneumatic fluid, e.g. compressed air, may flow. The pneumatic circuit comprises a conduit defined inside the stem 36, which is hollow, such conduit being in fluid communication with a chamber obtained inside the supporting component 35. From this chamber, the pneumatic fluid acts on the guiding portions 37 of the gripping elements 33 in order to displace the gripping elements 33 between the engagement position P1 and the disengagement position P2.

In use, the driving device 34 moves the gripping elements 33 along a direction parallel to the axis A of a neck 9, towards the lid 1, until the abutment plane 38 abuts against the end wall 2 of the lid 1, as shown in FIG. 7. From this position, the gripping elements 33 move towards the lid 1 slightly more, so as to exert on the lid 1 a force directed towards the container 10, i.e. a compressing force, which allows the lid 1 to be positioned correctly on the neck 9. The gripping elements 33 thus exert a leveling action on the lid 1, in order to ensure that the end wall 2 of the lid 1 is perpendicular to the axis A of the neck 9, i.e. that the lid 1 is arranged coaxially to the neck 9.

This helps in applying correctly the lid 1 onto the neck 9, which might be a critical operation, as explained below.

It may happen that, when the lid 1 is stripped by a container 10 in the distribution unit 21, the lid 1 is not correctly positioned onto the neck 9. For example, the lid 1 might rest on the neck 9 in a tilted position, in which the axis A of the neck 9 is inclined relative to an axis of the neck 9.

This situation may be worsened because the containers 10 are not rigid containers, but are made of a flexible packaging sheet material and have dimensions varying within relatively large tolerances between different containers. Furthermore, the stiffness of the containers is not as high as that of a glass bottle or jar.

Consequently, the containers 10 need to be handled with care, to ensure that they are not damaged by the apparatus 20.

In addition, the neck 9 may be relatively soft, particularly if moulded directly on the sheet packaging material. For this reason, the neck 9 might be slightly elliptical, instead of being perfectly circular.

In this situation, the compressing force applied by the gripping elements 33 on the lid 1 before starting to screw the lid 1 on the neck 9, may adapt the lid 1 to the neck 9, thereby enabling the lid 1 to be subsequently more easily screwed on the neck 9.

It is stressed that the leveling action exerted on the lid 1 before starting to screw the latter is carried out under controlled conditions, so that the neck 9 is not damaged. To this end, using a linear motor included in the driving device 34 is particularly helpful, because a linear motor allows the applied forces to be easily controlled.

While the abutment plane 38 applies on the lid 1 the compression force that allows the lid 1 to be leveled on the neck 9, the gripping elements 33 are still in the disengagement position P2. After leveling the lid 1, the gripping elements 33 are moved one towards another by the pneumatic arrangement associated thereto, so that they can reach the engagement position P1.

It is stressed that, in the engagement position P1, the distance between the gripping elements 33 is not sufficiently short to allow the screwing portion 40 to interact with the side wall 3 of the neck 9, because the joining surfaces 42 of the screwing portion 40 are not in contact with the side wall 3. The lid 1 is screwed by the active surfaces 41 of the screwing portions 40, which act on the appendages 6.

Hence, after the gripping elements 33 are moved close to one another so as to reach the engagement position P1, the gripping elements 33 might need to be rotated by a certain angle around the axis of the stem 36, so as to bring an active surface 41 of each screwing portion 40 in contact with an appendage 6 of the lid 1, as shown in FIG. 8. At this point, the screwing portions 40 are actually engaged with the appendages 6 and may effectively rotate the lid 1.

Since, in order to rotate the lid 1, the gripping elements 33 engage with the appendages 6 that protrude from the side wall 3, possible misalignments between the lid 1 and the stem 36 can be compensated.

In particular, the gripping elements 33 may initially rotate the lid 1 in a rotation direction that is opposite the rotation direction that allows the lid 1 to be screwed onto the neck 9, i.e. in an unscrewing direction, which is usually counterclockwise. This allows the lid 1 to be so positioned, that the starting point of an internal thread 4 on the lid 1 is aligned with the starting point of an outer thread 13 on the neck 9. This makes easier screwing the lid 1 onto the neck 9.

The gripping elements 33 are now rotated in a screwing direction, and simultaneously moved towards the container 10, so that the lid 1 is screwed onto the neck 9.

In the embodiment shown, in which the lid 1 comprises the appendages 6, the lid 1 is rotated in the screwing direction until the appendages 6 have reached a preset position, particularly a preset angular position relative to the neck 9. At this point, the lid 1 is correctly screwed onto the neck 9 and can be released by the gripping elements 33. In other words, a position control that controls the position of the appendages 6 is used for determining the end of the screwing operation allowing the lid 1 to be screwed onto the neck 9.

This position control is made possible by a position sensor, particularly an encoder, which is associated to the driving device 34. The sensor allows the angular position of the stem 36, and hence of the gripping elements 33, to be determined.

In an embodiment that is not shown, the applying heads 23 may be configured to apply, onto the containers 10, lids 1 that do not comprise the appendages 6. i.e. lids 1 that are delimited by a cylindrical side wall 3.

In this case, in order to screw a lid 1 onto the respective neck 9, the gripping elements 33 act on the side wall 3 of the lid 1, i.e. grip directly a portion of cylindrical surface delimiting the lid 1 around its axis. The screwing action terminates when a preset screwing force has been applied onto the lid 1. In other words, instead of determining when the screwing operation is finished by controlling the position of the lid 1, the end of the screwing operation is determined by controlling the screwing force applied on the lid 1. This can be done by controlling the torque applied by the gripping elements 33 on the lid 1. It is thus possible to avoid damages on the lid 1 and/or on the neck 9 due to an excessive screwing force.

Owing to the pneumatic arrangement, which moves the gripping elements 3 between the engagement position P1 and the disengagement position P2, the force applied onto the lid 1 while rotating the latter can be controlled easily and precisely, by controlling the pressure acting on the guiding portions 37 of the gripping elements 33.

The risks of damaging the lids 1 and/or the necks 9 are therefore strongly reduced.

The apparatus 20 further comprises a plurality of welding heads 43 for induction welding the lid 1 to the protruding portion 17 that projects from the closing element 14. In particular, each welding head 43 is configured to generate in the conductive layer of the welding promoting element 7 an electric current, which melts the heat-sealable layer of the welding promoting element 7 facing the closing element 14. This heat-sealable layer thus adheres to the protruding portion 17, which consequently becomes permanently attached to the lid 1.

The welding heads 43 are arranged downstream of the applying heads 23, along the conveying device that advances the containers 10 in the advancement direction F. The welding heads 43 thus interact with the containers 10 after the applying heads 23 have screwed the lids 1 onto the containers 10.

The number of welding heads 43 may be equal to the number of applying heads 23. In the example shown, two welding heads 43 are provided, but this condition is not essential and the number of welding heads 43 could also be different from two.

The distance between two consecutive welding heads 43 is equal to the distance between two consecutive containers advancing along the advancement direction F.

Similarly, the distance between the last applying head and the first welding head 43 is equal to the distance between two consecutive containers 10.

The welding heads 43 are movable forwards and backwards in the advancement direction F, i.e. are movable synchronously with the conveying device that advances the containers 10 in the advancement direction F, along a part of the path of the conveying device. Thus, each welding head 43 is capable of following a container 10 in order to interact with the corresponding lid 1 for a time sufficient to ensure welding of the lid 1 to the protruding portion 17. When the lid 1 has been welded to the protruding portion 17, the welding head 43 moves backwards so as to reach an initial position in which it is ready to weld a new lid 1 to the corresponding container 10.

All the welding heads 43 can be moved synchronously by a common mechanism. To this end, all the welding heads 43 can be supported by a common support member 44 so that, by moving the support member 44 in the advancement direction F, all the welding heads 43 are moved together in the advancing direction F forwards or backwards.

In the example shown, the welding heads 43 are moved by the same movement device 26 that also displaces the applying heads 23. The support member 44 is fixed relative to the support element 24, for example because the support member 44 is directly fastened to the support element 24. Thus, when the motor 27 moves the support element 24 by driving the belt 29, the support member 44, and consequently also the welding heads 43, are also displaced in the advancement direction F.

By using the same movement device 26 for moving both the applying heads 23 and the welding heads 43, it is possible to obtain an apparatus 20 that is structurally simple, since it comprises only one motor 27 to actuate a plurality of heads. The apparatus 20 is also easy to be operated, since all the applying heads 23 and the welding heads 43 can be simultaneously controlled as far as displacement along the advancement direction F is concerned.

Furthermore, the position of the applying heads 23, of the welding heads 43 and of the distribution unit 21 can be easily adjusted if, for example, there is the need to change the size and/or shape of the containers 10 to be processed.

FIG. 4 shows a frame 45 of the apparatus 20, which is fixed relative to the packaging line that processes the containers 10. The frame 45 comprises two end brackets 46, arranged at opposite sides of the apparatus 20. The distribution unit 21, the applying heads 23 and the welding heads 43 are supported by a common supporting arrangement that comprises, in addition to the support element 24 and the support member 44, a structure supporting the movement device 26 and a structure supporting the distribution unit 21. The common supporting arrangement comprises two supporting plates 49 each of which is fastened to an end bracket 46. If there is a change in the shape of the containers 10 to be processed, for example because the inclination of the top wall of the containers 10 has been changed, it is sufficient to oscillate the common supporting arrangement that supports the distribution unit 21, the applying heads 23 and the welding heads 43, relative to the frame 45. Said common supporting arrangement can in particular be oscillated around a fulcrum 47. A plurality of arcuate slots 48 are provided on both the end brackets 46 in order to allow the supporting plates 49 to be rotated relative to the end brackets 46.

If there is the need to change the height of the containers 10 to be processed, the vertical position of the distribution unit 21 can be easily adjusted by vertically displacing the whole structure supporting the distribution unit 21, which is made possible by adjusting slots 50 provided in the supporting plate 49 adjacent to the distribution unit 21. The height of the distribution unit 21 above the conveying device that advances the containers 10 in the advancement direction F can therefore be adjusted.

Similarly, the vertical position of the applying module comprising the applying heads 23 and of the welding module comprising the welding heads 43 can be easily adjusted by means of few and simple adjustment operations. The support element 24 and the support member 44 are actually positioned in the supporting arrangement so that their height relative to the conveying device is adjustable.

Thus, the apparatus 20 has high flexibility.

Figure 10:
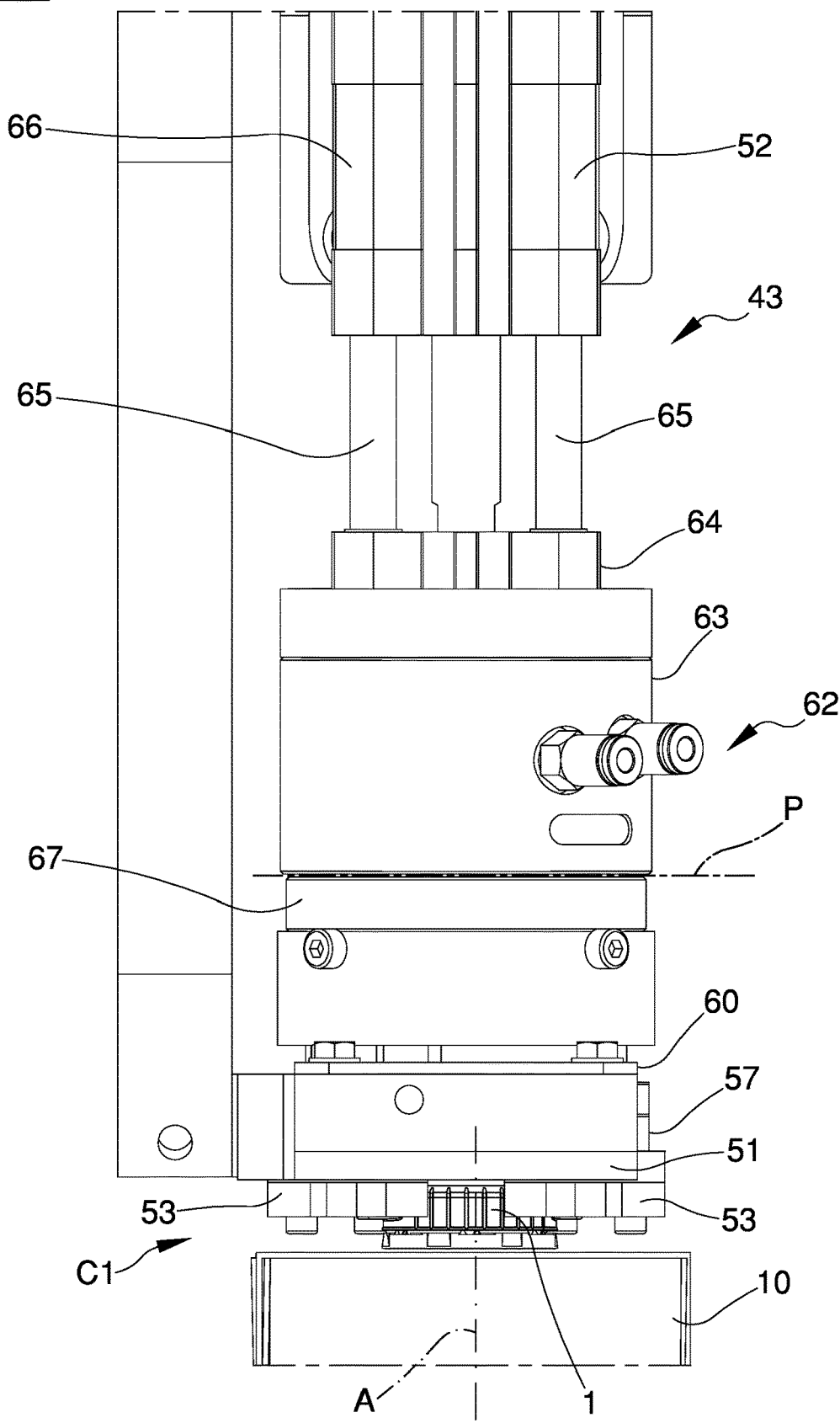
FIG. 10 is an enlarged front view, showing a detail of a welding head in the working configuration of FIG. 9.

FIG. 10 shows in detail a welding head 43 acting on a lid 1 of a container 10. The welding head 43 comprises an electric induction generating element 51 including a coil that is not shown. By activating the coil, an electric current is induced in the conductive layer of the welding promoting element 7, with a consequent generation of localized heat causing the heat-sealable layer of the welding promoting element 7 facing the neck 9 to be welded to the protruding portion 17.

The welding head 43 comprises an actuator device 52 for displacing the electric induction generating element 51 in a displacement direction arranged transversely, in particular perpendicularly, to the advancement direction F, so as to move the electric induction generating element 51 towards a lid 1 or alternatively away from a lid 1. More precisely, the actuator device 52 is intended to move the electric induction generating element 51 parallelly to the axis of the lid 1 that is being welded.

The actuator device 52 may comprise for example an electric linear motor or a pneumatic actuator. The actuator device 52 is configured to displace the electric induction generating element 51 between an active configuration C1, shown for example in FIG. 10, and an inactive configuration C2, shown in FIG. 4. In the inactive configuration C2, the electric induction generating element 51 is at a distance from the lid 1, so as not to interact with the latter. In the active configuration C1, the electric induction generating element 51 interacts with the lid 1 and welds the latter to the protruding portion 17. In the embodiment shown, the electric induction generating element 51 is in contact with the end wall 2 of the lid 1 in the active configuration C1. In an embodiment that is not shown, the electric induction generation element 51 may nevertheless weld the lid 1 to the protruding portion 17 by remaining at a short distance from the end wall 2 in the active configuration C1.

Each welding head 43 further comprises a pair of gripping members 53 for gripping the lid 1, particularly at the side wall 3 thereof, so as to avoid undesired side displacements of the lid 1 during welding.

As shown in FIGS. 11 and 12, each gripping member 53 comprises an interaction portion 54 for interacting with the lid 1. The interaction portion 54 of a gripping member 53 is delimited by two contact surfaces 55 for contacting the side wall 3 of the lid 1. The contact surfaces 55 are substantially flat. In the example shown, the contact surfaces 55 of a gripping member 53 define respective planes that are perpendicular to one another.

The gripping members 53 of a welding head 43 are symmetrical with respect to one another. Hence, in the example shown, the four contact surfaces 55 of the two interacting gripping members 53 lie in respective planes that are arranged at right angles one to another, thereby defining an ideal square, in plan view.

In use, each contact surfaces 55 of a pair of gripping members 53 lies in a respective plane parallel to the axis of a lid 1.

Between the two contact surfaces 55 of a gripping member 53, a recess 56 is provided in the interacting portion 54. The recess 56 has the purpose of housing an appendage 6 of a lid 1 while the lid 1 is gripped by the gripping members 53.

The gripping members 53 of a welding head 43 are movable between an open position Q1, shown in FIG. 11, and a closed position Q2, shown in FIG. 12. In the open position Q1, the gripping members 53 are far away from one another and do not interact with a lid 1. In the closed position Q2, the gripping members 53 are closer to one another, so as to hold a lid 1 between the contact surfaces 55.

As shown in FIGS. 11 and 12, each welding head 43 further comprises a carrying element 57 for supporting the gripping members 53. The carrying element 57 may be arranged in a back region of the welding head 43.

Each gripping member 53 comprises a guiding part 58 that is slidingly coupled to the carrying element 57. The guiding part 58 may be for example T-shaped and engages in a correspondingly shaped seat of the carrying element 57, so as to be guided by the carrying element 57 when the gripping members 53 move between the open position Q1 and the closed position Q2.

Each gripping member 53 further comprises an intermediate portion 59 that connects the interaction portion 54 to the guiding part 58.

A pneumatic system is provided for displacing the gripping members 53 between the open position Q1 and the closed position Q2. The pneumatic system comprises a pneumatic circuit inside which a pneumatic fluid, e.g. compressed air, may flow. The pneumatic circuit comprises a chamber obtained inside the carrying element 57. From this chamber, the pneumatic fluid acts on the guiding parts 58 of the gripping members 53 in order to displace the gripping members 53 between the open position Q1 and the closed position Q2.

The carrying element 57 is fastened to a mounting component 60 arranged above the electric induction generating element 51.

Each welding head 43 further comprises a compensating device 62 that allows the electric inducting generating element 51 to be centered relative to the end wall 2 of the lid 1, by compensating a possible misalignment between the electric inducting generating element 51 and the lid 1. The compensating device 62 is interposed between the actuator device 52 and the electric inductive generating element 51.

The compensating device 62 comprises a first component 63 that is fixed relative to the actuator device 52. In particular, the first component 63 is fixed relative to a plate 64 of the actuator device 52. The plate 64 is in turn connected to a plurality of columns 65 of the actuator device 52, the columns 65 being slidable relative to a main body 66 of the actuator device 52 when the actuator device 52 moves the gripping members 53 between the active configuration C1 and the inactive configuration C2.

The compensating device 62 further comprises a second component 67 coupled to the first component 63. In particular, the coupling between the first component 63 and the second component 67 has two degrees of freedom, since the second component 67 is capable of sliding in two directions relative to the first component 63. More precisely, the first component 63 and the second component 67 are in contact to one another in an interface plane P and the second component 67 is capable of sliding in the interface plane P relative to the first component 63. The interface plane P is parallel to a flat surface of the electric induction generating element 51, said flat surface being intended to contact the end wall 2 of the lid 1.

The interface plane P is arranged transversely, in particular perpendicularly, to the displacement direction along which the actuator device 52 displaces the electric induction generating element 51 when moving the latter between the active configuration C1 and the inactive configuration C2.

In use, the interface plane P is arranged transversely, in particular perpendicularly, to the axis A of the neck 9. In other words, the interface plane P is parallel to the end wall 2 of the lid 1 and also to a top wall of the container 10.

The second component 67 is closer to the electric induction generating element 51 than the first component 63. In other words, the second component 67 faces towards the electric induction generating element 51, whereas the first component 63 faces away from the electric induction generating element 51.

The mechanism that allows second component 67 to slide relative to the first component 63 will not be described in detail, since the compensating device 62 is known per se.

The electric induction generating element 51 is fixed relative to the second component 67 as far as displacement in a plane parallel to the interface plane P is concerned.

As will be described in greater detail hereinbelow, when the welding head 43 interacts with a lid 1 in order to weld the latter to a protruding portion 17, the electric induction generating element 51 is first brought in the active configuration C1. The gripping members 53 are still in the open position Q1, as shown in FIG. 5. The gripping members 53 are then brought into the closed position Q2 by the pneumatic system associated thereto. It may happen that the cap 1 is not perfectly centered relative to the electric induction generating element 51 and hence relative to the gripping members 53. If this occurs, a center of the end wall 2 of the lid 1 is not coincident with a central point of an ideal quadrilateral defined by the contact surfaces 55. Hence, when the gripping members 53 move one towards another to reach the closed position Q2, the side wall 3 of the lid 1 contacts one of the contact surfaces 55 before contacting the other three contact surfaces 55. Under the contact force exerted by the lid 1 on the first contact surface 55 with which the lid 1 interacts, the second component 67 of the compensating device 62 moves parallelly to the interface plane P, i.e. parallelly to the end wall 2 of the lid 1, in order to compensate such contact force. The electric induction generating element 51 moves together with the second component 67, thereby reaching a position in which the gripping members 53, and hence also the electric induction generating element 51, are centered relative to the lid 1.

In other words, the gripping members 53 exert a guiding action on the second component 67 of the compensating device 62, and consequently on the electric induction generating element 51. In particular, by means of the contact surface 55 that firstly contacts the lid 1, the lid 1 determines the position of the gripping members 53, which in turn determine the position of the second component 67, thereby allowing the electric induction generating element 51 to be centered relative to the lid 1. This is made possible because the gripping members 53 are associated with the second component 67, particularly by means of the carrying element 58, which is fixed relative to the second component 67 as far as displacement parallelly to the interface plane P is concerned.

At this point, the electric induction generating element 51 may correctly weld the end wall 2 of the lid 1 to the protruding portion 17.

In operation, the containers 10 are arranged in a sequence at a preset distance from one another by a sequencing device that is not shown. The containers 10 are then advanced along the advancement direction F so as to pass below the distribution unit 21. Here, each container 10 receives a lid 1, which rests on the neck 9 without being fully applied to the latter. The lid 1 may be released in a random angular position on the neck 9, i.e. the distribution unit 21 may be so configured that a position control on the angular position of the lids 1 is not applied.

Subsequently, the containers 10 arrive below the applying heads 23, and the gripping elements 33 of each applying head 23 are vertically displaced by the respective driving device 34, so as to bring the abutment plane 38 of each gripping element 33 in contact with the end wall 2 of each lid 1. The gripping elements of each gripping head 23, which are still in the disengagement position P2, as shown in FIG. 5, apply a compressing force on the respective lid 1, i.e. push the lid 1 towards the neck 9. This allows the lid 1 to be leveled on the neck 9, i.e. to be positioned on the neck 9 with the top wall 2 substantially perpendicular to the axis of the neck 9. The gripping elements 33 of each applying head 23 are then moved into the engagement position P1, as shown in FIG. 6, and the lid 1 is initially rotated in an unscrewing direction so that its internal thread 4 engages with the outer thread 13 of the neck 9. Thereafter, the lid 1 is rotated in a screwing direction, so as to be screwed onto the neck 9, until a predetermined angular position of the lid 1, or a predetermined screwing force, has been reached.

The operations described above, aimed at screwing a lid onto a corresponding neck 9, are carried out simultaneously on respective lids 1 by all the applying heads 23 of the group of applying heads 23, i.e. by all the applying heads 23 supported by the support element 24. In the meantime, the support element 24 is moved in the advancement direction F by the movement device 26, so that the applying heads 23 advance along the advancement direction F together with the containers 10, while applying thereon the respective lids 1.

Figure 9:
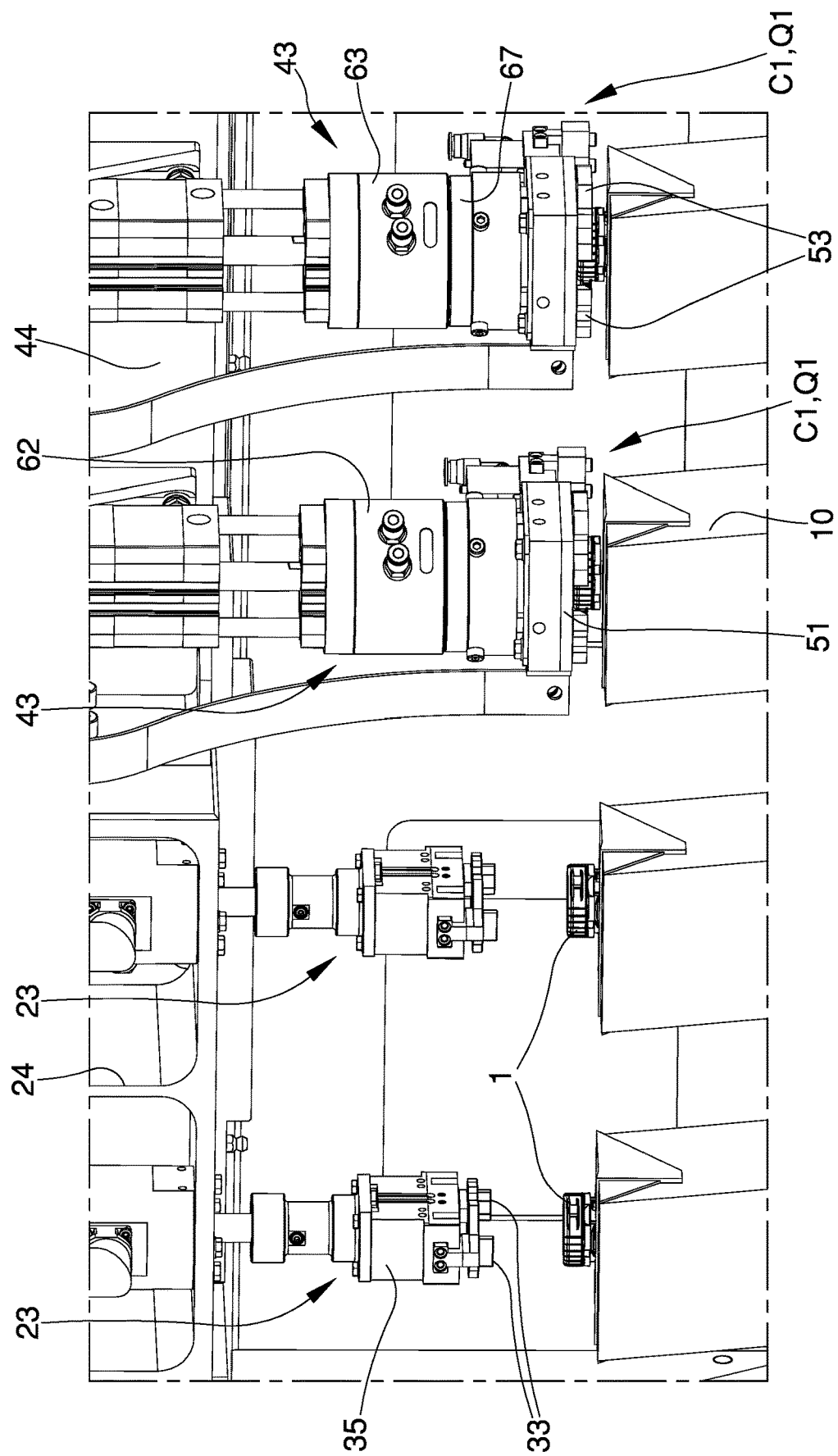
FIG. 9 is a view like FIG. 5, showing the applying heads and the welding heads in another working configuration.

When the lids 1 have been completely screwed onto the necks 9, the gripping elements 33 of each applying head are opened to reach the disengagement position P2, and are displaced upwards in order to disengage from the corresponding lid 1, as shown in FIG. 9. The movement device 26 now displaces the applying heads 23 backwards, so that the applying heads 23 can engage with a new group of containers 10.

The containers 10 on which the lids 1 have been applied continue to move along the advancement direction F towards the welding heads 43, so as to arrive below the welding heads 43. Each welding head 43 is then displaced downwards, until the respective electric induction generating element 31 contacts the end wall 2 of a lid 1 in the active configuration C1. The gripping members 53 are in the open position Q1, as shown in FIGS. 5 and 9.

After reaching the active configuration C1, the gripping members 53 of each welding head 43 are brought into the closed position Q2, as shown in FIG. 6. The side wall 3 of the lid 1 is contacted by at least one contact surface 55 of a gripping member 53. Depending on which contact surface 55 contacts the side wall 3 of the lid 1, the compensating device 62 allows the electric induction generating element 51 to move in a plane perpendicular to the end wall 2 of the lid 1, so as to reach a centered position relative to the lid 1. The lid 1 may now be welded to the protruding portion 17 of the closing element 14, owing to the welding promoting element 7.

While the welding heads 43 interact with the containers 10, the latter continue to be advanced along the advancement direction F. The welding heads 43 thus weld the lids 1 on the respective containers 10 while moving together with the containers 10 that are advanced along the advancement direction F. To this end, the movement device 26 moves the support member 44 along the advancement direction F, which causes the welding heads 43, which are fixed relative to the support member 44, to be moved together, i.e. synchronously, along the advancement direction F.

Once the lids 1 have been welded onto the necks 9, the gripping members 53 are opened and move away from the corresponding lid 1, which is thus released from the welding head 43. The welding heads 43 supported by the support member 44 are moved backwards by the movement device 26, so as to reach a position in which the welding heads 43 may engage with a new group of containers 10.

It is intended that, while the applying heads 23 interact with a group of containers 10 by screwing thereon corresponding lids 1, the welding heads 43 interact with a further group of containers 10 by welding the corresponding lids 1 onto respective protruding portions 17. Thus, the screwing and welding operations that were described above are carried out simultaneously on different groups of containers 10.

In an alternative embodiment, the apparatus 20 may be used to apply, onto the necks 9, lids 1 that are substantially round, i.e. that do not possess the appendages 6. In this case, the gripping elements 33 and the gripping members 53 may have a simpler structure and be configured to engage directly with the side wall 3 of the lids 1.

In any case, the apparatus 20, and particularly the welding heads 43 thereof, allow the lids 1 to be reliably and effectively welded to the opening devices provided on the containers 10, and particularly to the protruding portions 17, even at high production rates. Furthermore, the gripping elements 33 and the gripping members 53 can be shaped as desired, thereby allowing also non-round lids 1 to be applied.

The invention claimed is:

1. A welding head for welding a lid to a container having an opening device, the welding head comprising:
    a welding element for welding the lid to the opening device of the container comprising at least two gripping members for holding the lid during welding; and
    a compensating device configured to center the welding element relative to the lid upon detection of a misalignment between the welding element and the lid comprising:
        a first component facing away from the welding element; and
        a second component facing towards the welding element,
    wherein the at least two gripping members are configured to position the second component based on a position of the lid.

2. The welding head according to claim 1, wherein the compensating device is configured to move the welding element in a plane extending transversely to an axis of the lid.

3. The welding head according to claim 1, wherein the first component interacts with the second component through an interface plane, and wherein the second component is configured to slide parallel to the interface plane relative to the first component.

4. The welding head according to claim 3, wherein the second component supports the welding element.

5. The welding head according to claim 1, further comprising:
    a carrying element that is fixed relative to the second component with respect to an interface plane, and wherein the carrying element supports the gripping members.

6. The welding head according to claim 5, wherein each gripping member further comprises:
    a guiding part that slidingly engages in a corresponding seat of the carrying element,
    wherein the gripping members are configured to move between an open position, in which the gripping members do not interact with the lid, and a closed position, in which the gripping members hold the lid.

7. The welding head according to claim 1, wherein the gripping members further comprise:
    a contact surface for contacting at least a portion of a side wall of the lid and for determining a position of the gripping members with respect to an interface plane.

8. The welding head according to claim 7, wherein each gripping member comprises at least two contact surfaces for contacting respective portions of the side wall of the lid and for determining a respective position of the respective gripping member with respect to the interface plane.

9. The welding head according to claim 8, wherein each gripping member comprises a recess located between the at least two contact surfaces, wherein the recess houses an appendage protruding from the side wall of the lid.

10. The welding head according to claim 8, wherein the contact surfaces of each gripping member define respective contact planes that are perpendicular to one another.

11. The welding head according to claim 1, and further comprising:
    an actuator for displacing the welding element in a displacement direction and between an active configuration, in which the welding element is closer to an end wall of the lid for welding the end wall to the opening device, and an inactive configuration, in which the welding element is further away from the end wall.

12. The welding head according to claim 11, wherein the actuator further comprises a moveable plate and the second component is fixed relative to the movable plate.

13. The welding head according to claim 12, wherein the displacement direction is transverse to an interface plane.

14. The welding head according to claim 1, wherein the welding element further comprises:
    an electric induction generating element for generating an electric current configured to heat-seal the lid to the opening device.

15. A welding head for welding a lid to a container having an opening device, wherein the lid has an axis, a side wall parallel to the axis, and an end wall transverse to the axis, the welding head comprising:
    a welding element for welding the lid to the opening device of the container;
    an actuator for displacing the welding element in a displacement direction parallel to the axis of the lid; and
    a compensating device configured to move the welding element into axial alignment with the lid, wherein the compensating device further comprises:
        at least two gripping members, each having a contact surface for contacting respective portions of the side wall of the lid and for determining a respective position of the respective gripping member;

a coupling component coupled to the gripping members and configured to move in an interface plane extending transverse to the lid axis, wherein movement of the coupling component in the interface plane moves the welding element transverse to the lid axis.

* * * * *